(12) United States Patent
Chen

(10) Patent No.: US 12,356,996 B1
(45) Date of Patent: Jul. 15, 2025

(54) MANUAL MEAT GRINDER

(71) Applicant: Xu'e Chen, Shantou (CN)

(72) Inventor: Xu'e Chen, Shantou (CN)

( * ) Notice: Subject to any disclaimer, the term of this patent is extended or adjusted under 35 U.S.C. 154(b) by 0 days.

(21) Appl. No.: 18/748,300

(22) Filed: Jun. 20, 2024

(51) Int. Cl.
| | |
|---|---|
| *A22C 17/00* | (2006.01) |
| *A47J 42/12* | (2006.01) |
| *A47J 42/14* | (2006.01) |
| *A47J 42/20* | (2006.01) |
| *A47J 42/38* | (2006.01) |
| *B02C 18/18* | (2006.01) |

(52) U.S. Cl.
CPC .......... *A22C 17/0026* (2013.01); *A47J 42/14* (2013.01); *B02C 18/18* (2013.01); *A47J 42/12* (2013.01); *A47J 42/20* (2013.01); *A47J 42/38* (2013.01)

(58) Field of Classification Search
CPC .. A47J 42/14; A47J 42/20; A47J 42/24; A47J 42/34; A22C 17/0026
See application file for complete search history.

(56) References Cited

U.S. PATENT DOCUMENTS

| | | | | |
|---|---|---|---|---|
| 4,967,649 | A * | 11/1990 | Ephraim | A47J 42/16 99/287 |
| 6,431,389 | B1 * | 8/2002 | Jerstroem | A47J 36/02 220/574.3 |
| 8,083,167 | B1 * | 12/2011 | Namakian | A47J 42/24 241/169.1 |
| 9,241,597 | B2 * | 1/2016 | Dukat | A47J 42/14 |
| 9,392,908 | B2 * | 7/2016 | Edwards | A47J 42/38 |
| 9,873,125 | B1 * | 1/2018 | LaGuardia, Jr. | A24F 13/00 |
| 10,039,418 | B2 * | 8/2018 | Staiano | A47J 42/00 |
| 10,602,881 | B2 * | 3/2020 | Gumbel | A47J 42/12 |
| 10,617,259 | B2 * | 4/2020 | Staiano | A47J 42/00 |
| 10,912,419 | B2 * | 2/2021 | Abehasera | B02C 18/16 |
| D964,798 | S * | 9/2022 | Ding | D7/381 |
| 11,690,480 | B2 * | 7/2023 | Santos | A47J 42/14 241/169.1 |
| 11,712,700 | B1 * | 8/2023 | Henderson | A47J 42/34 241/168 |

(Continued)

FOREIGN PATENT DOCUMENTS

CN 220371188 U * 1/2024

OTHER PUBLICATIONS

DEK Manufacturing Co., 'Snap Fit Joints: Types & Benefits', https://www.dekmake.com/snap-fit-joints-types-benefits/, Jan. 28, 2025 (Year: 2025).*

*Primary Examiner* — Jared O Brown
(74) *Attorney, Agent, or Firm* — Daniel M. Cohn

(57) ABSTRACT

A manual meat grinder is provided. The manual meat grinder includes a bottom cover and an upper cover. The bottom cover includes lower grinding teeth disposed at intervals, and the upper cover includes upper grinding teeth disposed at intervals. The upper cover covers the lower cover and is rotatably connected to the lower cover, so as to grind meat through cooperation of the upper grinding teeth and the lower grinding teeth. At least one of the bottom cover and the upper cover includes blocking components disposed at intervals, and the blocking components are correspondingly disposed at at least one of a periphery of the lower grinding teeth and a periphery of the upper grinding teeth. In this way, meat is prevented from moving toward edges of the manual meat grinder in a meat grinding process, so as to improve a meat grinding effect.

17 Claims, 11 Drawing Sheets

(56) References Cited

U.S. PATENT DOCUMENTS

| | | | |
|---|---|---|---|
| 11,737,603 B1* | 8/2023 | Qutami | A47J 42/38 |
| | | | 241/28 |
| 11,871,873 B1* | 1/2024 | Smith | A47J 43/25 |
| 11,957,157 B2* | 4/2024 | He | A47J 42/34 |
| D1,039,925 S* | 8/2024 | He | D7/693 |
| D1,056,646 S* | 1/2025 | Yuan | D7/693 |
| D1,062,364 S* | 2/2025 | Wang | D7/381 |
| 2008/0111012 A1* | 5/2008 | Cheung | A47J 43/1025 |
| | | | 241/168 |
| 2011/0180643 A1* | 7/2011 | Wong | A47J 43/1025 |
| | | | 241/169.1 |
| 2014/0138465 A1* | 5/2014 | Yen | A24C 5/40 |
| | | | 241/69 |
| 2014/0217213 A1* | 8/2014 | Edwards | A47J 42/38 |
| | | | 241/91 |
| 2015/0290652 A1* | 10/2015 | Metaxatos | A22C 17/0006 |
| | | | 241/199.12 |
| 2017/0245541 A1* | 8/2017 | Pagan | A47J 42/12 |
| 2018/0126386 A1* | 5/2018 | Witko | B02C 18/16 |
| 2018/0168398 A1* | 6/2018 | Wang | A47J 42/40 |
| 2019/0269277 A1* | 9/2019 | Larose | A47J 42/34 |
| 2020/0061629 A1* | 2/2020 | Breneman | A47J 42/34 |
| 2020/0367695 A1* | 11/2020 | Staiano | A47J 42/34 |
| 2020/0390284 A1* | 12/2020 | Griffin | A47J 42/14 |
| 2024/0099515 A1* | 3/2024 | Gorodetzer | A47J 42/34 |

* cited by examiner

MANUAL MEAT GRINDER

TECHNICAL FIELD

The present disclosure relates to a technical field of meat grinders, and in particular to a manual meat grinder.

BACKGROUND

In the prior art, a manual meat grinder grinds meat through cooperation of upper grinding teeth of an upper cover and lower grinding teeth of a lower cover, however, in a process that the upper cover rotates with respect to the lower cover, a certain centrifugal force is applied on the meat, so that the meat may move toward edges of the manual meat grinder, and since the meat at the edges of the manual meat grinder is far away from the upper grinding teeth and the lower grinding teeth, the meat is difficult to be effectively captured by the upper grinding teeth and the lower grinding teeth for grinding. As a result, a meat grinding efficiency of the manual meat grinder is relatively lower, and shredded meat and comminuted meat are not uniform.

SUMMARY

Embodiments of the present disclosure provide a manual meat grinder, which is capable of preventing meat from moving toward edges of the manual meat grinder in a meat grinding process, so as to improve a meat grinding effect.

The embodiments of the present disclosure provide the manual meat grinder, including a bottom cover and an upper cover. The bottom cover includes lower grinding teeth disposed at intervals, and the upper cover includes upper grinding teeth disposed at intervals. The upper cover covers the lower cover and is rotatably connected to the lower cover, so as to grind meat through cooperation of the upper grinding teeth and the lower grinding teeth. At least one of the bottom cover and the upper cover includes blocking components disposed at intervals, and the blocking components are correspondingly disposed at at least one of a periphery of the lower grinding teeth and a periphery of the upper grinding teeth.

In one embodiment, the upper cover includes the blocking components, and the blocking components are circumferentially disposed.

In one embodiment, the lower grinding teeth are divided into at least two rows, and the at least two rows of the lower grinding teeth have the same lower grinding teeth center point. The upper grinding teeth are divided into at least two rows, and the at least two rows of the upper grinding teeth have the same upper grinding teeth center point. The at least two rows of the upper grinding teeth and the at least two rows of the lower grinding teeth are sequentially staggered.

In one embodiment, distances respectively between one row of the upper grinding teeth and two rows of the lower grinding teeth adjacent to the one row of the upper grinding teeth are the same, and distances respectively between one row of the lower grinding teeth and two rows of the upper grinding teeth adjacent to the one row of the lower grinding teeth are the same.

In one embodiment, each of the upper grinding teeth and the lower grinding teeth includes at least three first blades, and a root portion of each of the at least three first blades is connected to the upper cover or the bottom cover, each of the at least three first blades includes a fixed end and a blade end respectively at two opposite ends thereof, and a distance between each fixed end and the blade end of a corresponding first blade is increased in a direction from a top portion of the corresponding first blade to the root portion of the corresponding first blade. The at least three first blades respectively include at least three fixed ends, and the at least three fixed ends are fixedly connected with each other, and the at least three first blades form included angles with each other.

In one embodiment, the included angles between the at least three first blades are the same.

In one embodiment, each of the at least three first blades includes a first cutting surface disposed on the top portion thereof, and each first cutting surface is inclined from the top portion of the corresponding first blade to a bottom portion of the corresponding first blade in a direction from the fixed end of the corresponding first blade to the blade end of the corresponding first blade.

In one embodiment, a width of each first cutting surface is decreased in a direction close to the blade end of the corresponding first blade.

In one embodiment, each first cutting surface includes a first segment and a second segment connected with the first segment, one end of each first segment away from the second segment of the first cutting surface of the corresponding first blade is connected to the fixed end of the corresponding first blade, and one end of each second segment away from the first segment of the first cutting surface of the corresponding first blade is connected to the bade end of the corresponding first blade. A width of each second segment is decreased in a direction away from the fixed end of the corresponding first blade.

In one embodiment, each blade end includes a second cutting surface and a third cutting surface, and a distance between each second cutting surface and the third cutting surface of the blade end of the corresponding first blade is increased in a direction close to the fixed end of the corresponding first blade.

In one embodiment, connections between each first cutting surface, each second cutting surface, and each third cutting surface are rounded.

In one embodiment, a thickness of each of the at least three first blades is decreased in a direction from the fixed end of the corresponding first blade to the blade end of the corresponding first blade.

In one embodiment, the manual meat grinder further includes an inner container, the inner container is detachably disposed in the bottom cover, and the inner container includes an accommodating groove having an opening facing upward, limiting holes is defined on a bottom wall of the accommodating groove, and the limiting holes are adapted to shapes of the lower grinding teeth.

In one embodiment, a cutter head is disposed on a middle portion of the bottom cover, the inner container further includes a blocking portion protruding upward, the blocking portion is adapted to an outer contour of the cutter head, and a middle hole for a top portion of the cutter head to pass through is defined on a top portion of the blocking portion.

In one embodiment, second blades are disposed on an outer side wall of the cutter head at intervals.

In one embodiment, the manual meat grinder further includes at least one handle, the at least one handle is disposed on the upper cover and is rotatably connected to the upper cover.

In one embodiment, the upper cover includes a cover body and at least one mounting tube, the at least one mounting tube is connected to a side wall of the cover body. The at least one handle is inserted into the at least one mounting tube and rotates with respect to the at least one mounting tube.

In one embodiment, the at least one handle includes a handle portion and a rotating portion, the rotating portion is connected to a bottom surface of the handle portion. The rotating portion includes two clamping portions disposed at intervals, and a deformation space is formed between the two clamping portions.

In one embodiment, at least one anti-skid component is disposed at a bottom portion of the bottom cover.

In one embodiment, the bottom cover includes a main body and extending portions, the extending portions are connected to an outer peripheral surface of the main body and are disposed at intervals, anti-skid protrusions are respectively disposed on the extending portions.

According to the manual meat grinder of the embodiments of the present disclosure, at least one of the bottom cover and the upper cover includes the blocking components disposed at intervals, and the blocking components are correspondingly disposed at least one of the periphery of the lower grinding teeth and the periphery of the upper grinding teeth. In this way, the blocking components correspondingly disposed at least one of the periphery of the lower grinding teeth and the periphery of the upper grinding teeth form a barrier. When the meat moves toward the edges of the manual meat grinder in the meat grinding process, the barrier blocks the meat to continue to move outward, so as to keep the meat in a grinding range of the upper grinding teeth and the lower grinding teeth, thereby more uniformly grinding the meat.

BRIEF DESCRIPTION OF DRAWINGS

In order to more clearly illustrate embodiments of the present disclosure or technical solutions in the prior art, accompanying drawings required in description of the embodiments or the prior art are briefly described below, and obviously, the accompanying drawings in the following description are merely some embodiments of the present disclosure, and for those who skilled in the art, other drawings may be obtained according to structures shown in these drawings without creative efforts.

Figure 1:
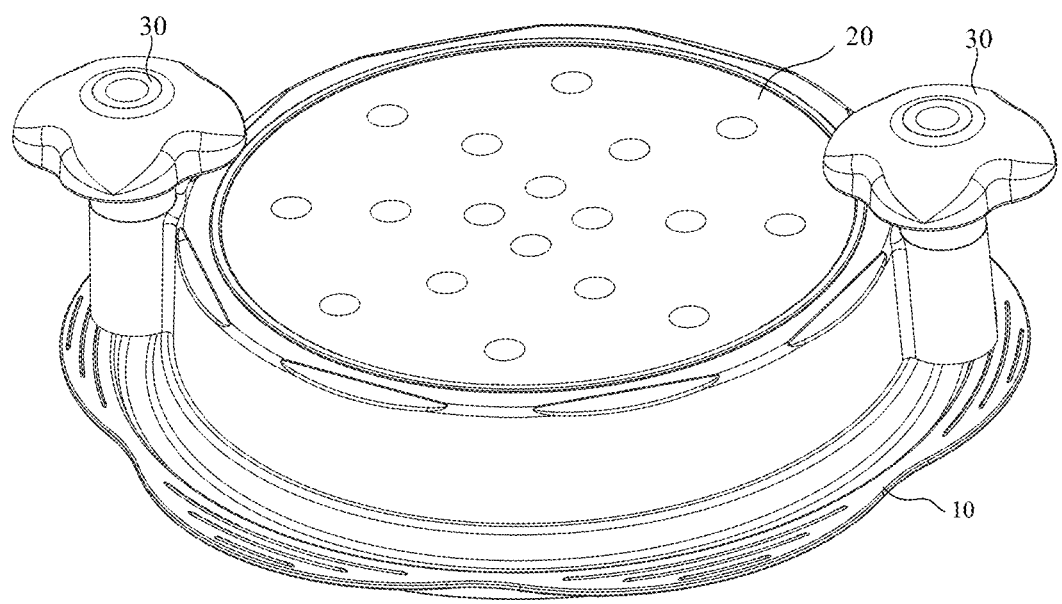
FIG. 1 is a structural schematic diagram of a manual meat grinder according to one embodiment of the present disclosure.

REFERENCE NUMERALS IN THE DRAWINGS 1. manual meat grinder; 10. bottom cover; 110. lower grinding teeth; 120. main body; 121. bottom plate; 121a. annular fixing groove; 122. annular surrounding frame; 130. extending portion; 140. cutter head; 141. second blade; 20. upper cover; 210. upper grinding teeth; 220. cover body 221. cover plate; 222. annular surrounding plate; 230. blocking component; 240. mounting tube; 211. first blade; 2111. fixed end; 2112. blade end; 2112a. second cutting surface; 2112b. third cutting surface; 2113. first cutting surface; 2113a. first segment; 2113b. second segment; 30. handle; 310. handle portion; 320. rotating portion; 321. clamping portion; 40. anti-skid component; 50. inner container; 510. limiting hole; 520. blocking portion; 530. middle hole.

Implementations, functional features, and advantages of the present disclosure are further described with reference to the accompanying drawings in combination with the embodiments.

DETAILED DESCRIPTION OF EMBODIMENTS

In order to better understand technical solutions of the present disclosure, embodiments of the present disclosure are described in detail below with reference to accompanying drawings.

When following description refers to the accompanying drawings, unless otherwise indicated, the same numbers in different drawings represent the same or similar elements. Implementations described in following exemplary embodiments do not represent all implementations consistent with this application. Instead, they are merely examples of apparatuses and methods consistent with some aspects of the present disclosure as recited in appended claims.

In the description of the present disclosure, it should be understood that terms "first", "second", etc. are only used for descriptive purposes, and cannot be understood as indicating or implying relative importance. Those who skilled in the art would understand specific meanings of the foregoing terms in the present disclosure according to specific situations. In addition, in the description of the present disclosure, unless otherwise stated, "a plurality of" means two or more, "and/or" used herein is merely an association relationship describing associated objects. For example, A and/or B may indicate three cases that A exists alone, A and B exist, and B exists alone, and a character "/" in the specification generally indicates an "or" relationship between the associated objects Unless otherwise defined, all technical and scientific terms used herein have the same meaning as commonly understood by those who skilled in the art to which the present disclosure belongs. The terms used in the specification are only for the purpose of describing specific embodiments, and are not intended to limit the present disclosure. As used herein, the term "and/or" includes any and all combinations of one or more of associated listed items.

Please refer to FIGS. 1-4, embodiments of the present disclosure provides a manual meat grinder 1, including a bottom cover 10 and an upper cover 20. The bottom cover 10 includes lower grinding teeth 110 disposed at intervals, and the upper cover 20 includes upper grinding teeth 210 disposed at intervals. The upper cover 20 covers the lower cover 10 and is rotatably connected to the lower cover 10, so as to grind meat through cooperation of the upper grinding teeth 210 and the lower grinding teeth 110. In a process that the upper cover 20 rotates with respect to the bottom cover 10, rotation directions of the upper grinding teeth 210 and the lower grinding teeth 110 are opposite, so that the meat placed between the upper grinding teeth 210 and the lower grinding teeth 110 is ground by the upper grinding teeth 210 and the lower grinding teeth 110 from multiple directions and multiple angles, and then in ground into shredded meat or comminuted meat.

Figure 5:
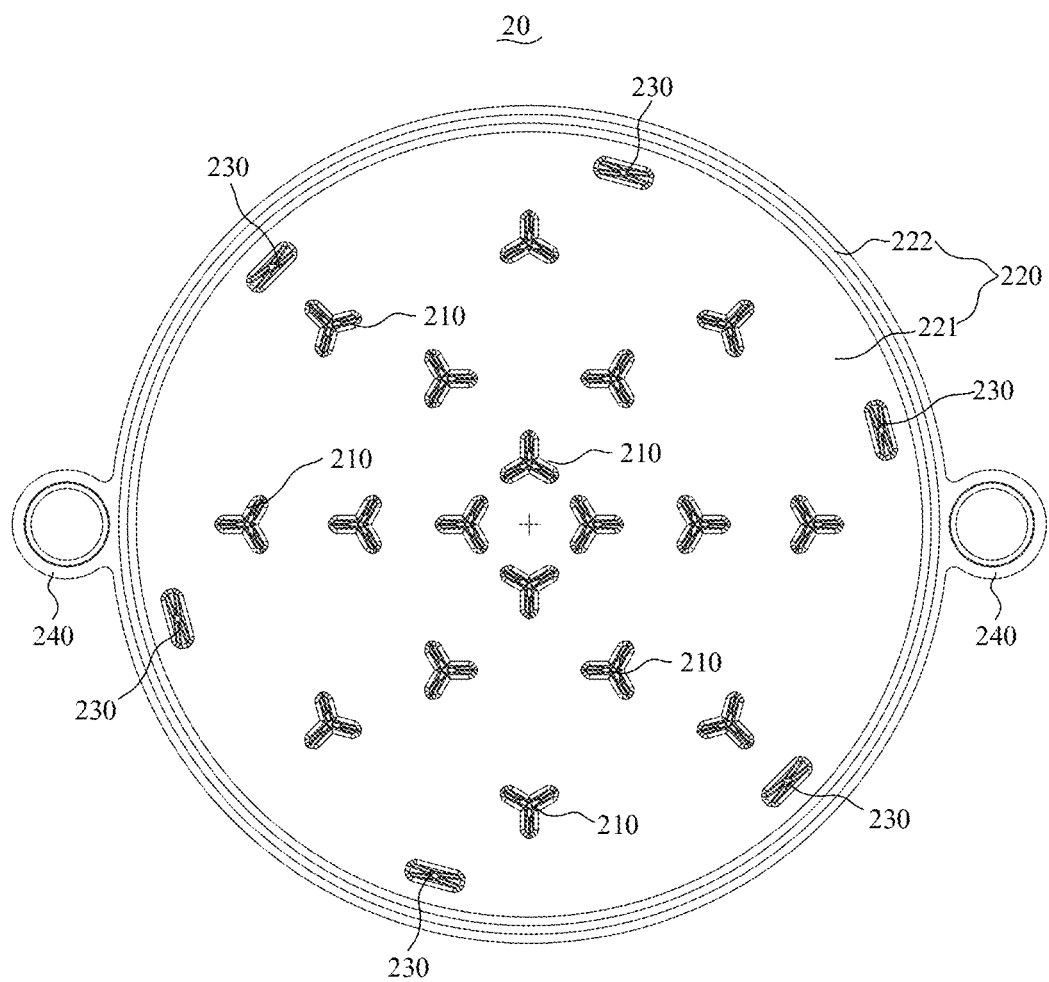
FIG. 5 is a structural schematic diagram of an upper cover according to one embodiment of the present disclosure.
Figure 8:
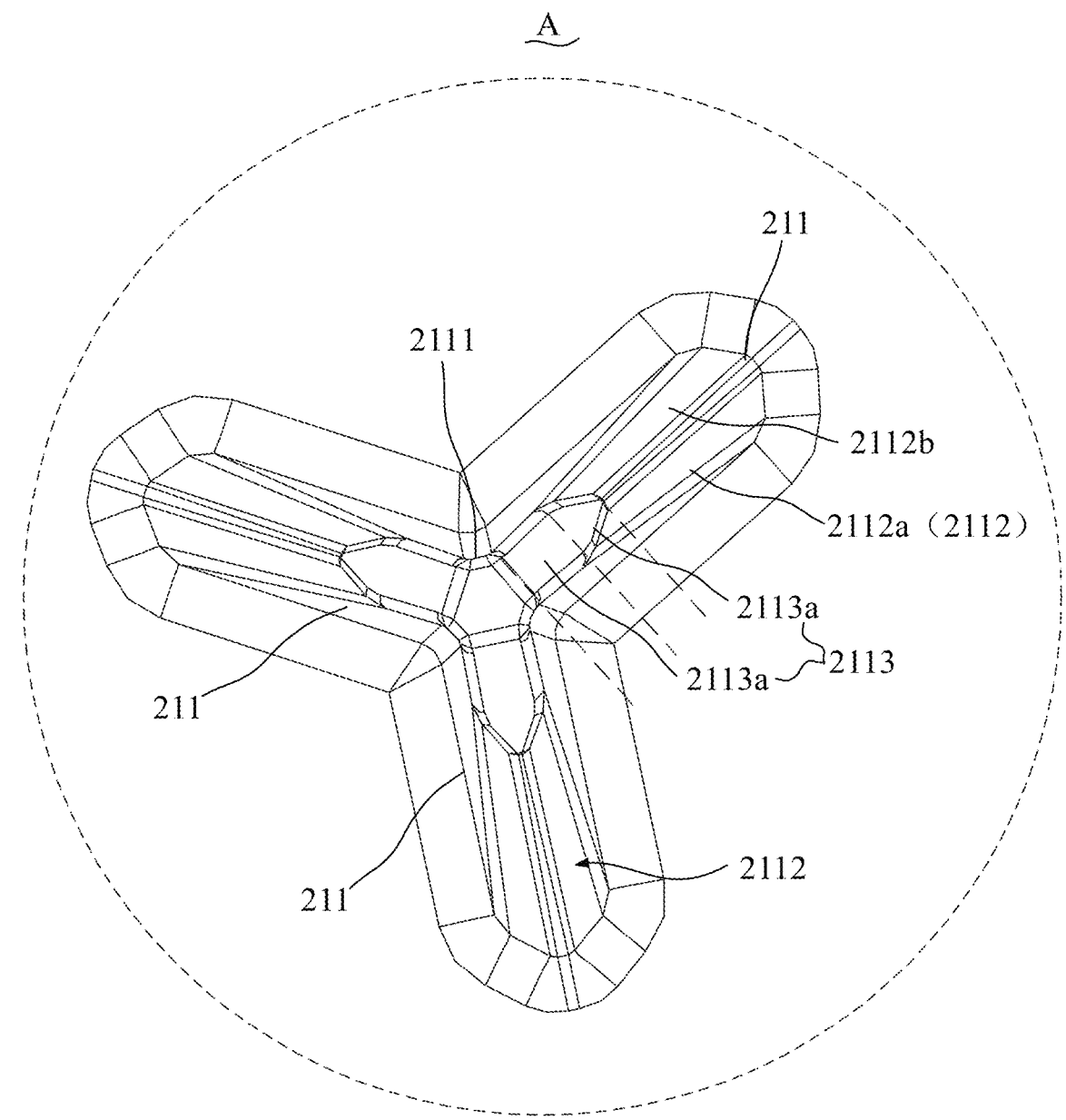
FIG. 8 is a partial enlarged schematic diagram of portion A shown in FIG. 7.

In some embodiments, please further refer to FIGS. 5 and 8, the bottom cover includes a bottom plate 121 and an annular surrounding frame 122, and the annular surrounding frame 122 is connected to an outer edge of the bottom plate 121 to form a first accommodation groove having a first opening facing upward. The lower grinding teeth 110 are disposed on the bottom plate 121 at intervals and are disposed in the first accommodating groove. The upper cover 20 includes a cover plate 221 and an annular surrounding plate 222, the annular surrounding plate 222 is connected to an outer edge of the cover plate 221 to form a second accommodating groove having a second opening facing downward, the upper grinding teeth 210 are disposed on the cover plate 221 at intervals and are disposed in in the second accommodating groove. When using the manual meat grinder 1, the cover plate 221 covers a top portion of the annular surrounding frame 122 to form a meat grinding cavity, the meat grinding cavity is configured to accommodate the meat, and the annular surrounding plate 222 and an annular side plate are capable of preventing the meat from throwing out or overflowing in a grinding process. The annular surrounding plate 222 is attached to an outer side surface of the annular surrounding frame 122 and rotates around the annular surrounding frame 122. In this way, shaking or instability caused by rotation of the upper cover 20 is reduced, stability of the upper cover 20 and the bottom cover 10 during the rotation is improved, and it is easier for users to control and operate the manual meat grinder 1.

Further, an annular fixing groove 121a facing upward is defined on the bottom plate 121, the upper cover 20 is disposed on the bottom plate 121 and covers the bottom plate 121, and a bottom portion of the upper cover 20 is partially embedded in the annular fixing groove 121a. Certainly, in other embodiments, the bottom cover 10 includes the bottom plate 121 and the annular surrounding frame 122, the upper cover 20 includes only a cover body 220, an annular limiting groove is defined on an inner side surface of the annular surrounding frame 122, and the cover body 220 is embedded in the annular limiting groove, in the way, the upper cover 20 and the bottom cover 10 are also capable of forming the meat grinding cavity and rotating with each other; or, the upper cover 20 includes the cover plate 221 and the annular surrounding plate 222, the bottom cover 10 includes only the bottom plate 121, the annular fixing groove facing upward is defined on the bottom plate 121, the upper cover 20 is disposed on the bottom plate 121 and covers the bottom plate 121, and the bottom portion of the upper cover 20 is partially embedded in the annular fixing groove 121a, in this way, the upper cover 20 and the bottom cover 10 are also capable of forming the meat grinding cavity and rotating with each other. Specific forms of the upper cover 20 and the bottom cover 10 are not limited herein.

It should be noted that the bottom cover 10 and the upper cover 20 are formed by injection molding of materials, such as polypropylene (PP), polyethylene (PE), polystyrene (PS), and polycarbonate (PC), etc., in which a production efficiency is high and a cost is low, so that mass production and better integration are achieved, and stability of the cooperation of the upper grinding teeth 210 and the lower grinding teeth 110 is improved. Specific materials of the bottom cover 10 and the upper cover 20 are not limited herein.

In order to better drive the upper cover 20 to rotate with respect to the bottom cover 10, please further refer to FIG. 1, the manual meat grinder 1 in the embodiments of the present disclosure further includes at least one handle 30, the at least one handle 30 is disposed on the upper cover 20 and is rotatably connected to the upper cover 20. The upper cover 20 includes a cover body 220 and at least one mounting tube 240, the at least one mounting tube 240 is connected to a side wall of the cover body 220, and the cover body 220 includes the cover plate 221 and the annular surrounding frame 122. The at least one handle 30 is inserted into the at least one mounting tube 240 and rotates with respect to the at least one mounting tube 240. The users may easily drive the manual meat grinder 1 to work through grasping the at least one handle 20 and rotating the upper cover 20 without use of additional tools or effort to grasp other portions. Moreover, the users may operate the manual meat grinder 1 with less effort through taking the at least one handle 30 as a lever point. Moreover, the users may use a lever effect to increase a rotation torque through rotating the at least one handle, so as to more easily push the upper grinding teeth 210 and the lower grinding teeth 110 in the manual meat grinder 1 to perform meat grinding.

Figure 2:
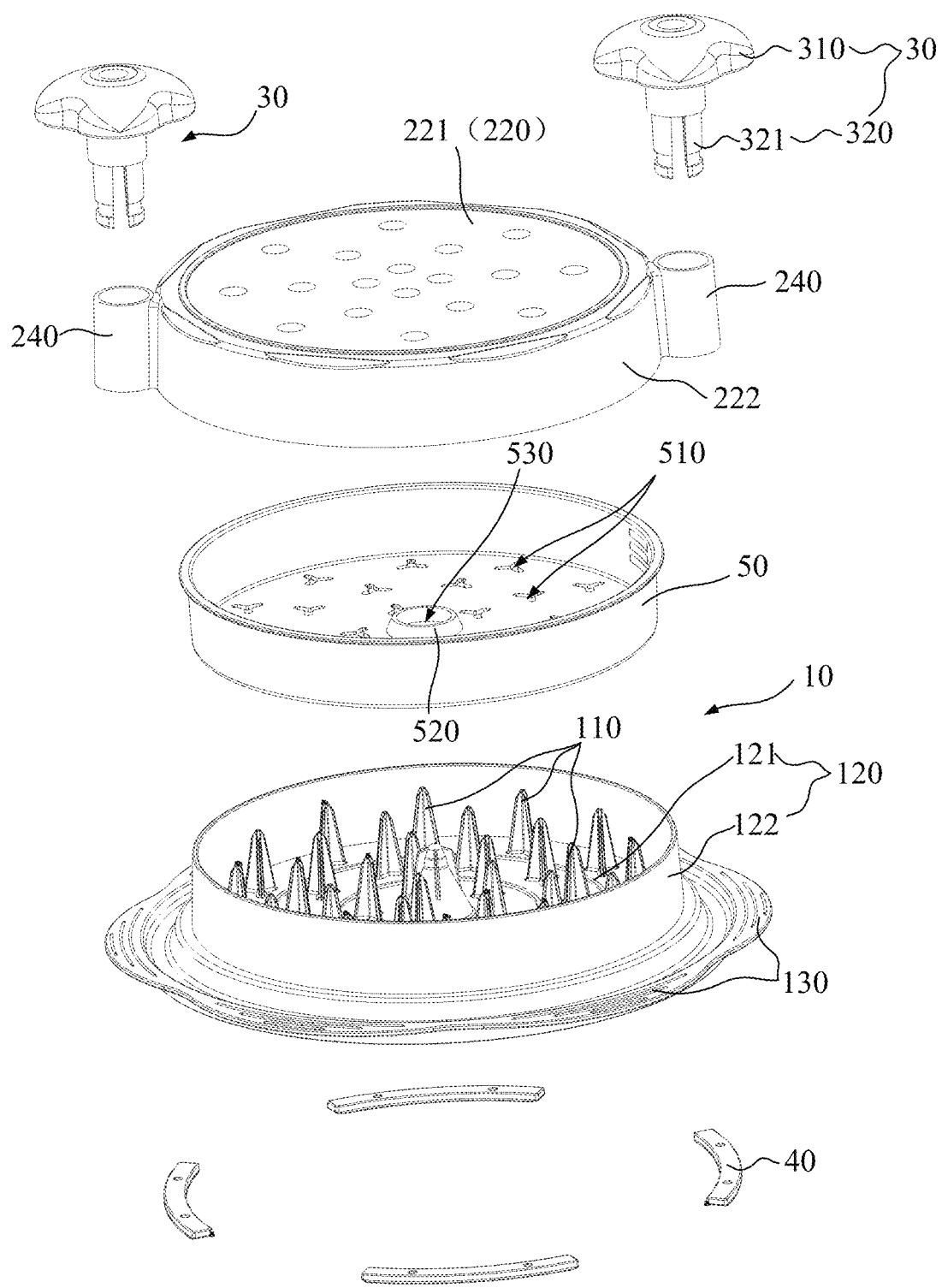
FIG. 2 is a first exploded schematic diagram of the manual meat grinder according to one embodiment of the present disclosure.
Figure 3:
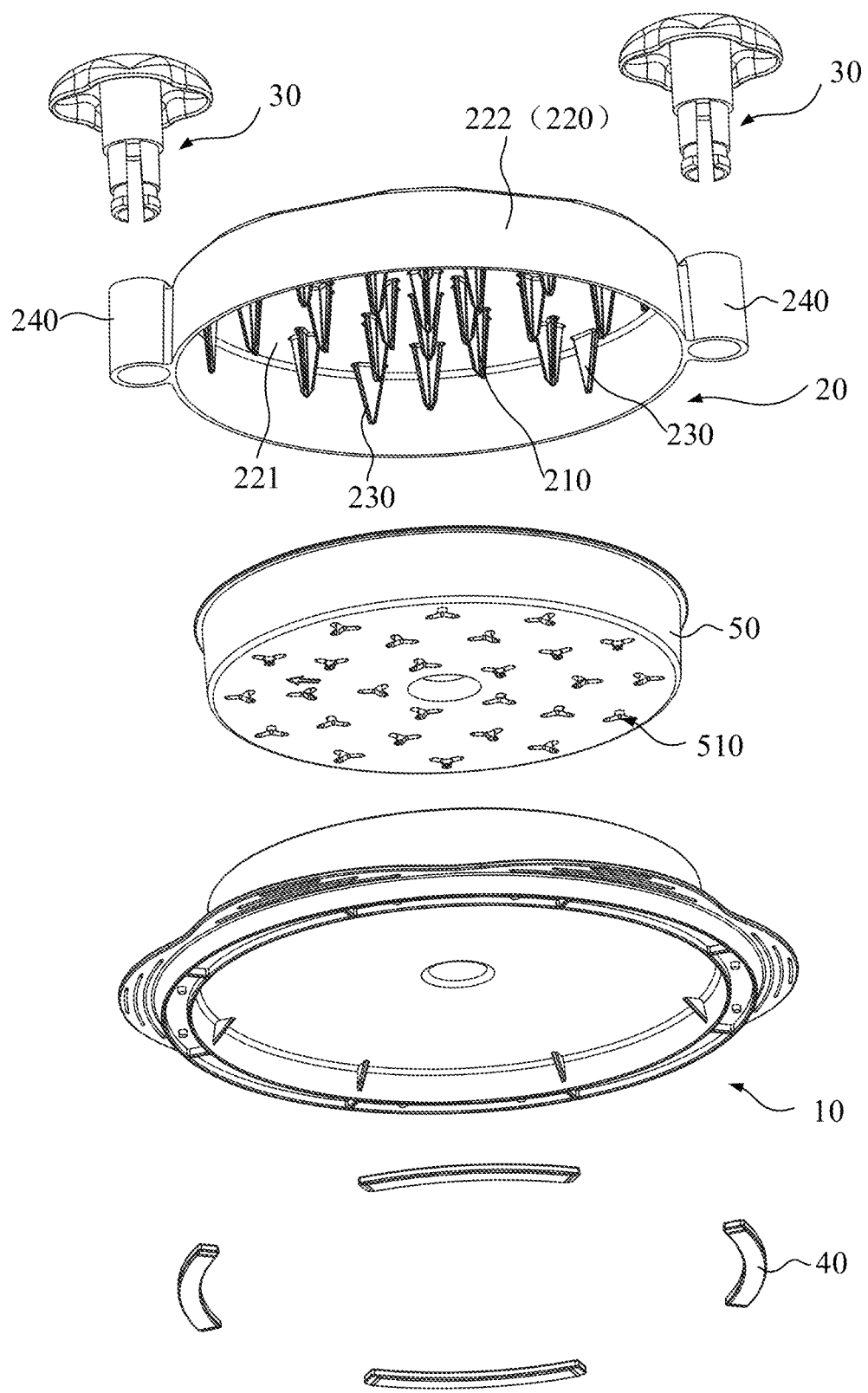
FIG. 3 is a second exploded schematic diagram of the manual meat grinder according to one embodiment of the present disclosure.
Figure 4:
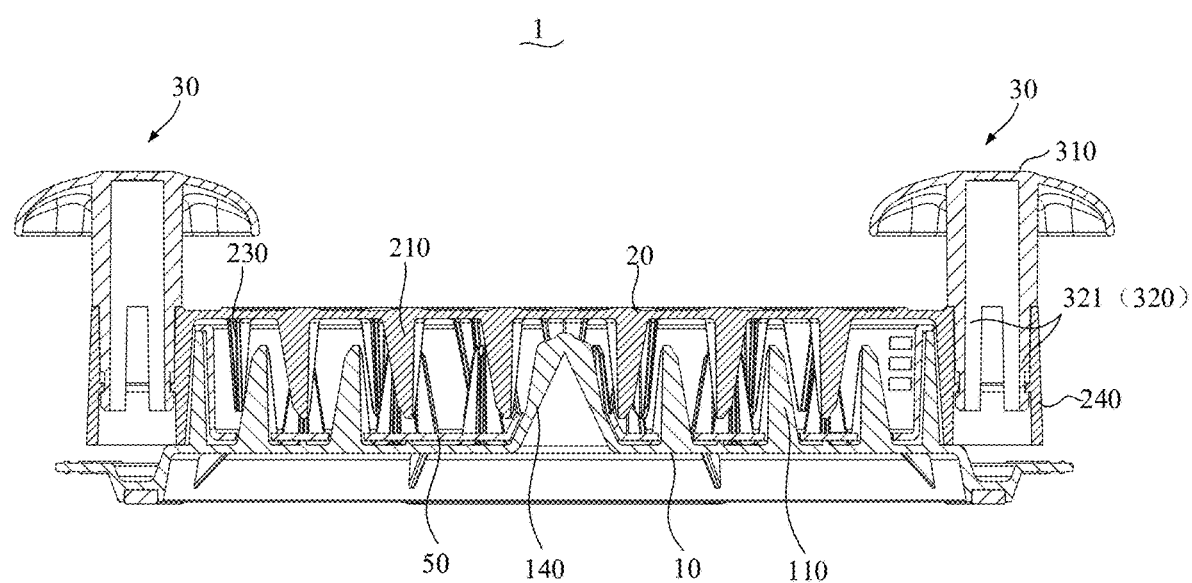
FIG. 4 is a cross-sectional schematic diagram of the manual meat grinder according to one embodiment of the present disclosure.

In order to improve a mounting efficiency of the at least one handle 300 and the at least one mounting tube 240, please refer to FIGS. 2-4, the at least one handle 30 includes a handle portion 310 and a rotating portion 320, the rotating portion 320 is connected to a bottom surface of the handle portion 310. The rotating portion 320 includes two clamping portions 321 disposed at intervals, and a deformation space is formed between the two clamping portions 321. The deformation space between the two clamping portions 321 allows the two clamping portions 321 to deform to some extent, so that the two clamping portions 321 are capable of being inserted into the at least one mounting tube 240, and when the two clamping portions 321 are completely inserted into the at least one mounting tube 240 and restore to original shapes thereof, the two clamping portions 321 are in close contact with the at least one mounting tube 240 to provide stable support and connection. In this way, the at least one handle 30 is prevented from accidentally falling off or loosening when using the manual meat grinder 1, thereby improving safety and stability of the manual meat grinder 1. Moreover, since the deformation space is formed between the two clamping portions 321, the at least one handle 30 is capable of being adapted to different sizes or shapes of the at least one mounting tube 240, such adaptability enables the at least one handle 30 to be applied to different types of the manual meat grinder 1, thereby improving universality and practicability of the at least one handle 30.

In order to improve stability of the manual meat grinder 1 when using the manual meat grinder 1, please refer to FIGS. 2 and 3, at least one anti-skid component 40 is disposed at a bottom portion of the bottom cover 10. The at least one anti-skid component 40 is in a form of an anti-skid pad. The at least one anti-skid component 40 greatly increases a friction force between the bottom cover 10 and the ground to prevent the bottom cover 10 from sliding or moving during use. Materials of the anti-skid pad are selected from, but not limited to, rubber, polyvinyl chloride (PVC), silica gel, and polyurethane (PU). It may be understood that one or more anti-skid components 40 may be provided, and adaptive adjustment may be performed according to requirements.

Figure 7:
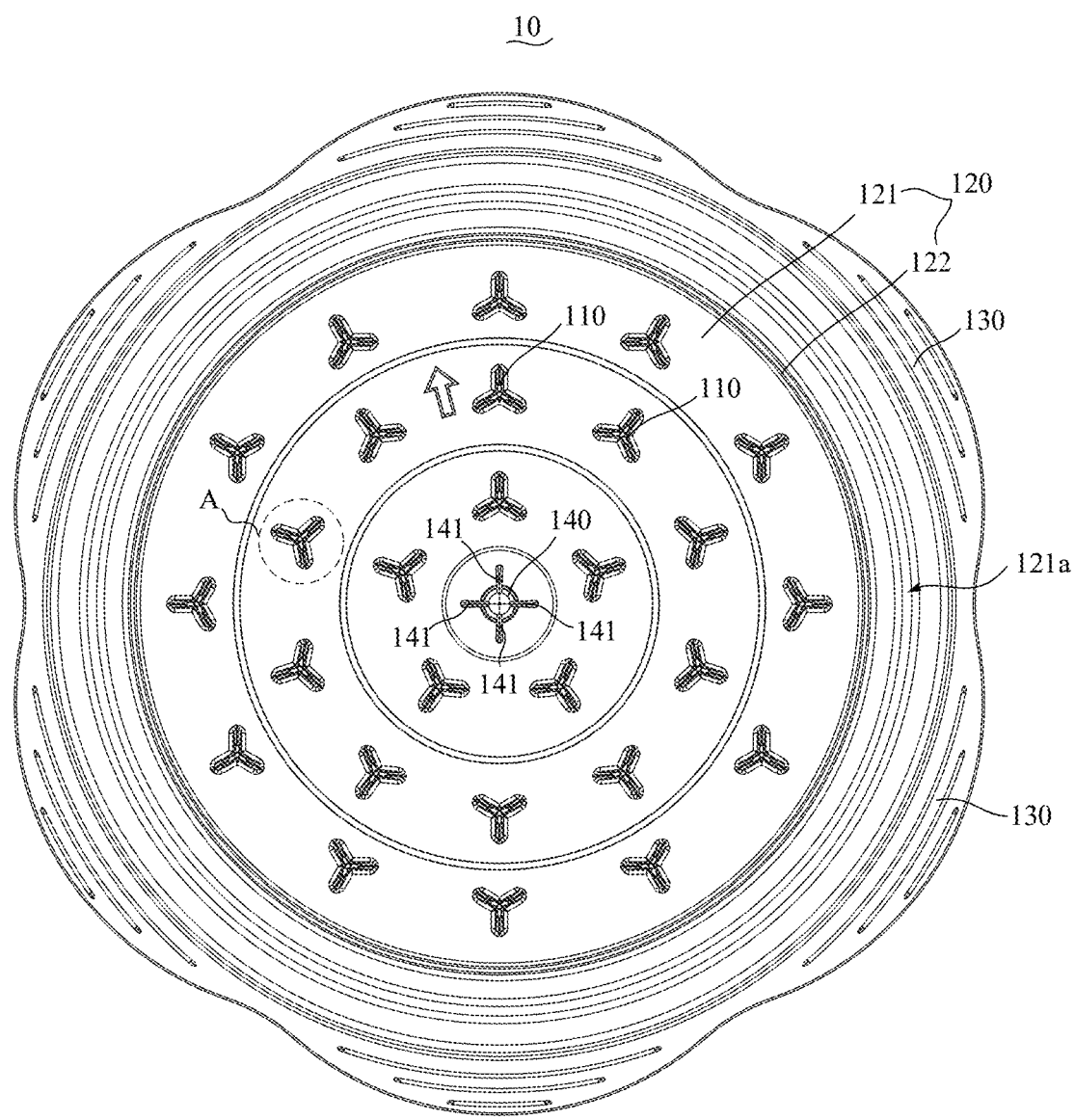
FIG. 7 is a structural schematic diagram of a bottom cover according to one embodiment of the present disclosure.

In some embodiments, please refer to FIG. 7, the bottom cover 10 includes a main body 120 and extending portions 130, the extending portions 130 are connected to an outer peripheral surface of the main body 120 and are disposed at intervals, anti-skid protrusions are respectively disposed on the extending portions 130. The main body 120 includes the bottom plate 121 and the annular surrounding plate 222. The extending portions 130 are disposed on the outer peripheral surface of the main body 120 for the users to directly contact, thereby facilitating force applying to fix the bottom cover 10, which ensures that the bottom cover 10 is more stably placed at a desired position and further reduces a risk of sliding or moving of the bottom cover 1.

However, in a process that the upper cover 20 rotates with respect to the lower cover 10 to perform the meat grinding through the cooperation of the upper grinding teeth 210 and the lower grinding teeth 110, a certain centrifugal force is applied on the meat, so that the meat may move toward edges of the meat grinding cavity, and since the meat at the edges of the meat grinding cavity is far away from the upper grinding teeth 210 and the lower grinding teeth 110, the meat is difficult to be effectively captured by the upper grinding teeth 210 and the lower grinding teeth 110 for grinding. As a result, a meat grinding efficiency of the manual meat grinder 1 is relatively lower, and the shredded meat and the comminuted meat are not uniform.

Therefore, an inventive concept of the embodiments of the present disclosure is as follows.

At least one of the bottom cover 10 and the upper cover 20 includes the blocking components 230 disposed at intervals, and the blocking components 230 are correspondingly disposed at least one of the periphery of the lower grinding teeth 110 and the periphery of the upper grinding teeth 210. In this way, the blocking components 230 correspondingly disposed at least one of the periphery of the lower grinding teeth 110 and the periphery of the upper grinding teeth 210 form a barrier. When the meat moves toward the edges of the manual meat grinder 1 in the meat grinding process, the barrier blocks the meat to continue to move outward, so as to keep the meat in a grinding range of the upper grinding teeth 210 and the lower grinding teeth 110, thereby more uniformly grinding the meat. The blocking components 230 are disposed at intervals, but the intervals are not necessarily equal, and may be adjusted according to designs and function requirements of the manual meat grinder 1. There may be two blocking components 230, three blocking components 230, four blocking components 230, or five blocking components 230 provided and the number of the blocking components 230 may be adjusted according to sizes and the function requirements of the manual meat grinder 1.

Figure 6:
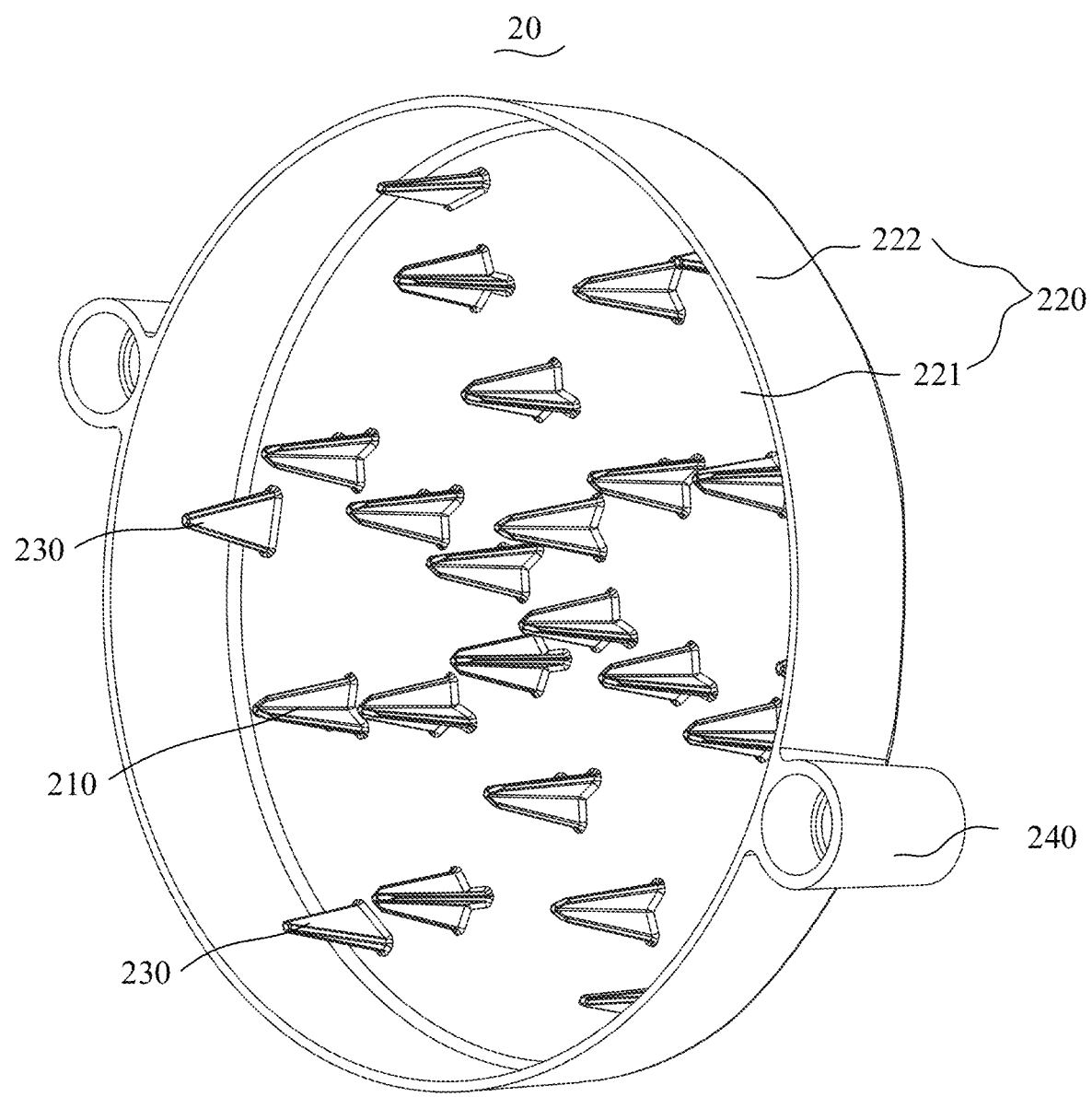
FIG. 6 is a structural schematic diagram of the upper cover being in another representation angle according to one embodiment of the present disclosure.

As an example, please refer to FIGS. 5-6, the upper cover 20 includes the blocking components 230, that is, the blocking components 230 are disposed on the cover body 220, and the blocking components 230 are circumferentially disposed. Further, the blocking components 230 are disposed at intervals in a circumferential direction of the cover body 220, and the intervals are equal, in this way, regardless of which position the meat moves toward, the blocking components 230 are capable of blocking the meat, so that the meat is prevented from moving outward, thereby ensuring that the meat is uniformly ground.

It should be noted that, in a case that both the bottom cover 10 and the upper cover 20 include the blocking components 230 at the same time, corresponding blocking components 230 of the bottom cover 10 and corresponding blocking components 230 of the upper cover 20 are staggered in order to avoid interference during rotation. In addition, the blocking components 230 may be of any shape, such as a triangle, a circle, a rectangle, etc., which is not limited herein.

In order to improve the meat grinding efficiency of the manual meat grinder 1, please refer to FIGS. 5 and 7, the lower grinding teeth 110 are divided into at least two rows, and the at least two rows of the lower grinding teeth 110 have the same lower grinding teeth center point. The upper grinding teeth 210 are divided into at least two rows, and the at least two rows of the upper grinding teeth 210 have the same upper grinding teeth center point. The at least two rows of the upper grinding teeth 210 and the at least two rows of the lower grinding teeth 110 are sequentially staggered in a case that the upper cover 20 cooperates with the bottom cover 10. The at least two rows of the upper grinding teeth 210 and the at least two rows of the lower grinding teeth 110 are sequentially staggered, so that the meat is ground by the upper grinding teeth 210 and the lower grinding teeth 110 from the multiple angles at the same time, thereby increasing the meat grinding efficiency. Moreover, since the at least two rows of the upper grinding teeth 210 and the at least two rows of the lower grinding teeth 110 work at the same time, the meat is more uniformly grounded in the meat grinding cavity, so that non-uniformity of the meat during the meat grinding process is reduced, and the meat after grinding is finer and more uniform. In addition, the at least two rows of the upper grinding teeth 210 and the at least two rows of the lower grinding teeth 110 are staggered, so that a larger meat grinding area is provided, thereby increasing meat processing capacity of the manual meat grinder 1, and the manual meat grinder is capable of better grinding large meat or tough meat. Compared with an arrangement of a single grinding tooth or a single row of grinding teeth, multiple rows of grinding teeth may reduce a wear speed of the grinding teeth, thereby prolonging a service life of the manual meat grinder.

Furthermore, distances respectively between one row of the upper grinding teeth 210 and two rows of the lower grinding teeth 110 adjacent to the one row of the upper grinding teeth 210 are the same, and distances respectively between one row of the lower grinding teeth 110 and two rows of the upper grinding teeth 210 adjacent to the one row of the lower grinding teeth 110 are the same. In this way, distances between the upper grinding teeth 210 and the lower grinding teeth 110 are the same, and the meat is more uniformly ground in the meat grinding process, thereby ensuring that the shredded meat and the comminuted meat are more consistent in size and fineness. Such design of the upper grinding teeth 210 and the lower grinding teeth 110 having equal distances with each other reduces the blocking phenomenon in the meat grinding process is reduced. When the meat is into the meat grinder, the meat may more smoothly pass through gaps formed between the upper grinding teeth 210 and the lower grinding teeth 110, thereby reducing difficulty of grinding interruption and cleaning caused by blockage of the meat. In addition, since the upper grinding teeth 210 and the lower grinding teeth 110 have the equal distances with each other, pressure and wear borne by each grinding tooth are relatively uniform, so that a service life of the grinding teeth is prolonged, and reduction of the meat grinding effect and increase of a maintenance cost caused by the wear of the grinding teeth is reduced.

In some embodiments, each of the upper grinding teeth 210 and the lower grinding teeth 110 includes at least three first blades 211. For example, three first blades 211 are provided in each of the upper grinding teeth 210 and the lower grinding teeth 110, and in other embodiments, four first blades 211, five first blades 211 may be provided in each of the upper grinding teeth 210 and the lower grinding teeth 110. A root portion of each of corresponding at least three first blades 211 of each of the upper grinding teeth 210 is connected to the upper cover 20, that is, the cover plate 221; a root portion of each of corresponding at least three first blades 211 of each of the lower grinding teeth 110 is connected to the lower cover 10, that is, the bottom plate 221. Please refer to FIGS. 8-10, each of the at least three first blades 211 includes a fixed end 2111 and a blade end 2112 respectively at two opposite ends thereof, and a distance between each fixed end 2111 and the blade end 2112 of a corresponding first blade 211 is increased in a direction from a top portion of the corresponding first blade 211 to the root portion of the corresponding first blade 211. The at least three first blades 211 respectively include at least three fixed ends 2111, and the at least three fixed ends 2111 are fixedly connected with each other, and the at least three first blades 211 form included angles with each other.

It may be understood that a width of the top portion of the corresponding first blade 211 is smaller than a width of the root portion of the corresponding blade 211, so that each top portion 211 is more pointed, and when the at least three first blades 211 are in contact with the meat, a larger force is concentrated on a smaller stress area. Such concentrated force enables the at least three first blades 211 to more efficiently grind the meat and improve the meat grinding efficiency. Moreover, each top portion with a relatively larger size may improve stability of connection between the corresponding first blade 211 and the upper cover 20 or the bottom cover 10. The at least three fixed ends 2111 of the at least three first blades 211 are fixedly connected, the at least three first blades 211 form included angles with each other, such structure ensure stability between the at least three first blades 211 in the meat grinding, thereby stably grinding the meat. In addition, since the at least three first blades 211 form the included angles with each other, the at least three first blades 211 are capable of cutting the meat in different directions, thereby further improving the meat grinding efficiency.

Figure 10:
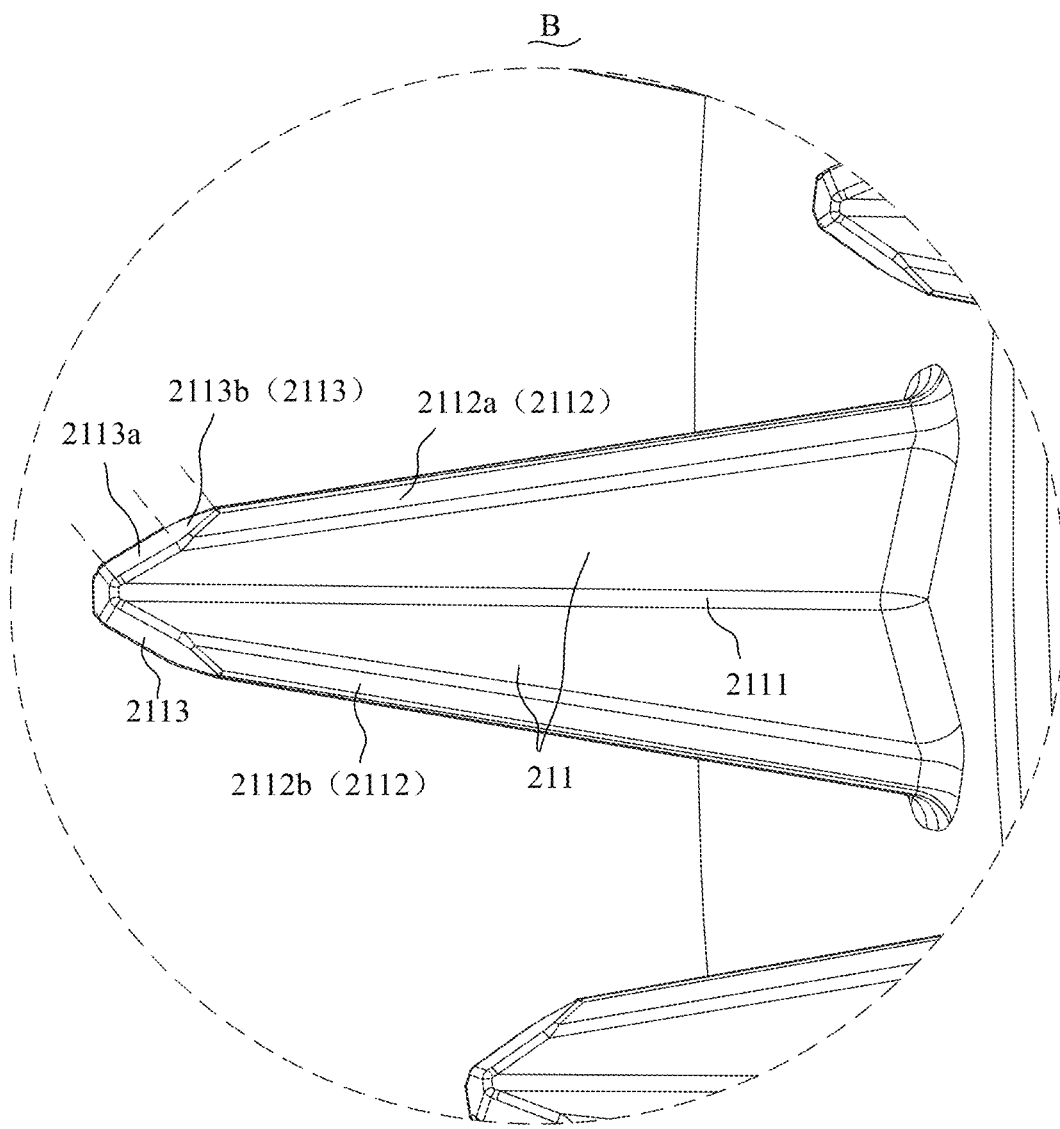
FIG. 10 is a partial enlarged schematic diagram of portion B shown in FIG. 9.

Please refer to FIG. 10, the included angles between the at least three first blades 211 are the same. That is, the at least three first blades 211 are circumferentially disposed. For example, three first blades 211 are provided in the embodiment of the present disclosure, and the included angles between the three first blades 211 are all 120°, so that the meat is uniformly ground by the three first blades 211 in the meat grinding process, thereby avoiding the meat from being unevenly ground. In other embodiments, the included angles between the at least three first blades 211 are different, which is not limited herein.

In some embodiments, please refer to FIGS. 8 and 10, each of the at least three first blades 211 includes a first cutting surface 2113 disposed on the top portion thereof, and each first cutting surface 2114 is inclined from the top portion of the corresponding first blade 211 to a bottom portion of the corresponding first blade 211 in a direction from the fixed end 2111 of the corresponding first blade 211 to the blade end 2112 of the corresponding first blade 211. Since each first cutting surface 2113 is inclined, the at least three first blades 211 is capable of more effectively grinding the meat during rotation of the upper cover 20, thereby improving an overall grinding efficiency of the manual meat grinder. Compared with that providing first cutting surfaces extending in a horizontal direction, each first cutting surface being inclined in the present disclosure encounters less drag during the meat grinding process since inclined cutting surfaces may better adapt to textures and structures of the meat, thereby reducing friction and resistance during the meat grinding process, and further enabling the manual meat grinder to more smoothly operate.

Please refer back to FIGS. 8 and 10, a width of each first cutting surface 2113 is decreased in a direction close to the blade end 2112 of the corresponding first blade 211. In this way, a cutting surface of each blade end 2112 is narrower, thereby more accurately and quickly grinding the meat, thereby improving the overall grinding efficiency of the manual meat grinder. As the width of each first cutting surface 2113 decreases in the direction close to the blade end 2112 of the corresponding first blade 211, concentrated pressure of the cutting edge each blade end 2112 increases, thereby enhancing a grinding force. Such enhanced grinding force may better grind the meat to ensure that the meat after grinding is finer.

Please further refer to FIGS. 8 and 10, each first cutting surface 2113 includes a first segment 2113a and a second segment 2113b connected with the first segment 2113a, a width of each second segment 2113b is decreased in a direction close to the blade end 2112 of the corresponding first blade 211. Each blade end 2112 includes a second cutting surface 2112a and a third cutting surface 2112b, and a distance between each second cutting surface 2112a and the third cutting surface 2112b of the blade end 2112 of the corresponding first blade 211 is increased in a direction close to the fixed end 2111 of the corresponding first blade 211. As shown in FIGS. 8 and 10, an edge of each second segment 2113b is a side edge of the second cutting surface 2112a of the blade end 2112 of the corresponding first blade 211 and a side edge of the third cutting surface 2112b of the blade end 2112 of the corresponding first blade 211. In this way, the meat is conveniently switched from each first cutting surface 2113 to the second cutting surface 2112a of the blade end 2112 of the corresponding first blade 211 and the third cutting surface 2112b of the blade end 2112 of the corresponding first blade 211 during the meat grinding process. In the meat grinding process, the meat is first compressed and guided by each first cutting surface 2113, and then is further compressed and concentrated as a result of a tapered design of the width of each second segment 2113b when being close to the blade end 2112 of the corresponding first blade 211. When the meat reaches the blade end 2112 of the corresponding first bade 211, the meat is more smoothly switched from each first cutting surface 2113 to the second cutting surface 2112a of the blade end 2112 of the corresponding first blade 211 and the third cutting surface 2112b of the blade end 2112 of the corresponding first blade 211, so that the meat is ground from multiple directions and multiple angles, thereby improving the meat grinding efficiency and the meat grinding effect of the manual meat grinder 1.

At the same time, the distance between each second cutting surface 2112a and the third cutting surface 2112b of the blade end 2112 of the corresponding first blade 211 is increased in the direction close to the fixed end 2111 of the corresponding first blade 211, that is, an end portion of each blade end 2112 away from the fixed end 2111 of the corresponding first blade 211 is more pointed, and when each blade end 2112 is in contact with the meat, a larger force is concentrated on a smaller stress area. Such concentrated force enables each blade end 2112 to more efficiently grind the meat and improve the meat grinding efficiency.

Furthermore, connections between each first cutting surface 2113, each second cutting surface 2112a, and each third cutting surface 2112b are rounded. In this way, a drag force applied on the meat in the meat grinding process is reduced, so that the meat may more easily and smoothly pass through each first cutting surface 2113, each second cutting surface 2112a, and each third cutting surface 2112b, thereby not only improving a working efficiency of the manual meat grinder, but also reducing wear of the manual meat grinder and prolonging the service life of the manual meat grinder.

In some embodiments, a thickness of each of the at least three first blades 211 is decreased in a direction from the fixed end 2111 of the corresponding first blade 211 to the blade end 2111 of the corresponding first blade 211. In this way, a portion of each of the at least three first blades 211 close to the blade end 2112 of the corresponding first blade 211 is sharper, so that the meat is more easily ground. Such design reduces a force required in the meat grinding process and improves the meat grinding efficiency.

Figure 11:
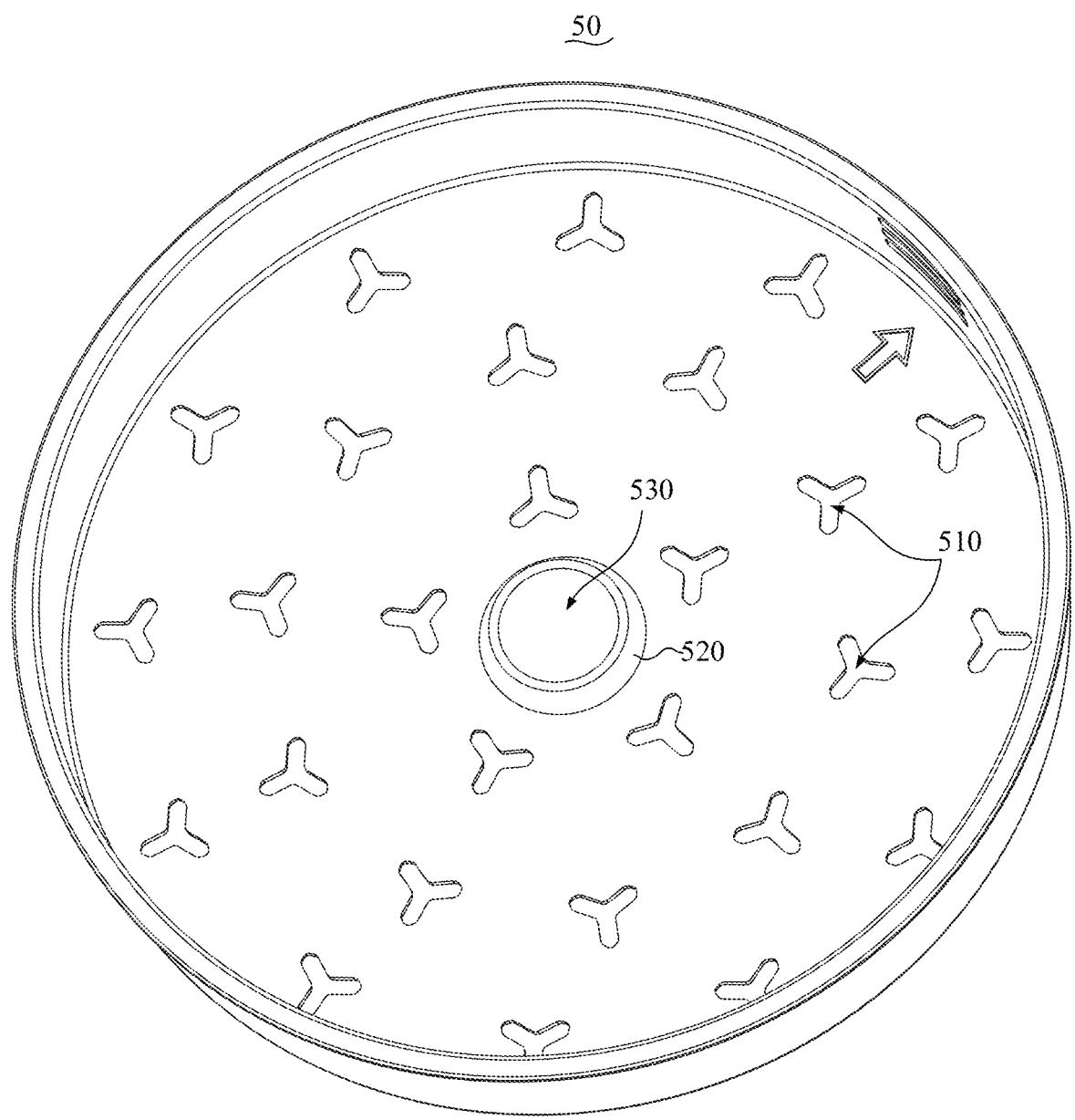
FIG. 11 is a structural schematic diagram of an inner container according to one embodiment of the present disclosure.

In order to conveniently taking out the shredded meat and the comminuted meat, please refer to FIG. 11, the manual meat grinder 1 further includes an inner container 50, the inner container 50 is detachably disposed in the bottom cover 10, and the inner container 50 includes an accommodating groove having an opening facing upward, limiting holes 510 is defined on a bottom wall of the accommodating groove, and the limiting holes 510 are adapted to shapes of the lower grinding teeth 110, so that the shredded meat and the comminuted meat after grinding are capable of being correspondingly taken out after detaching the inner container 50.

Figure 9:
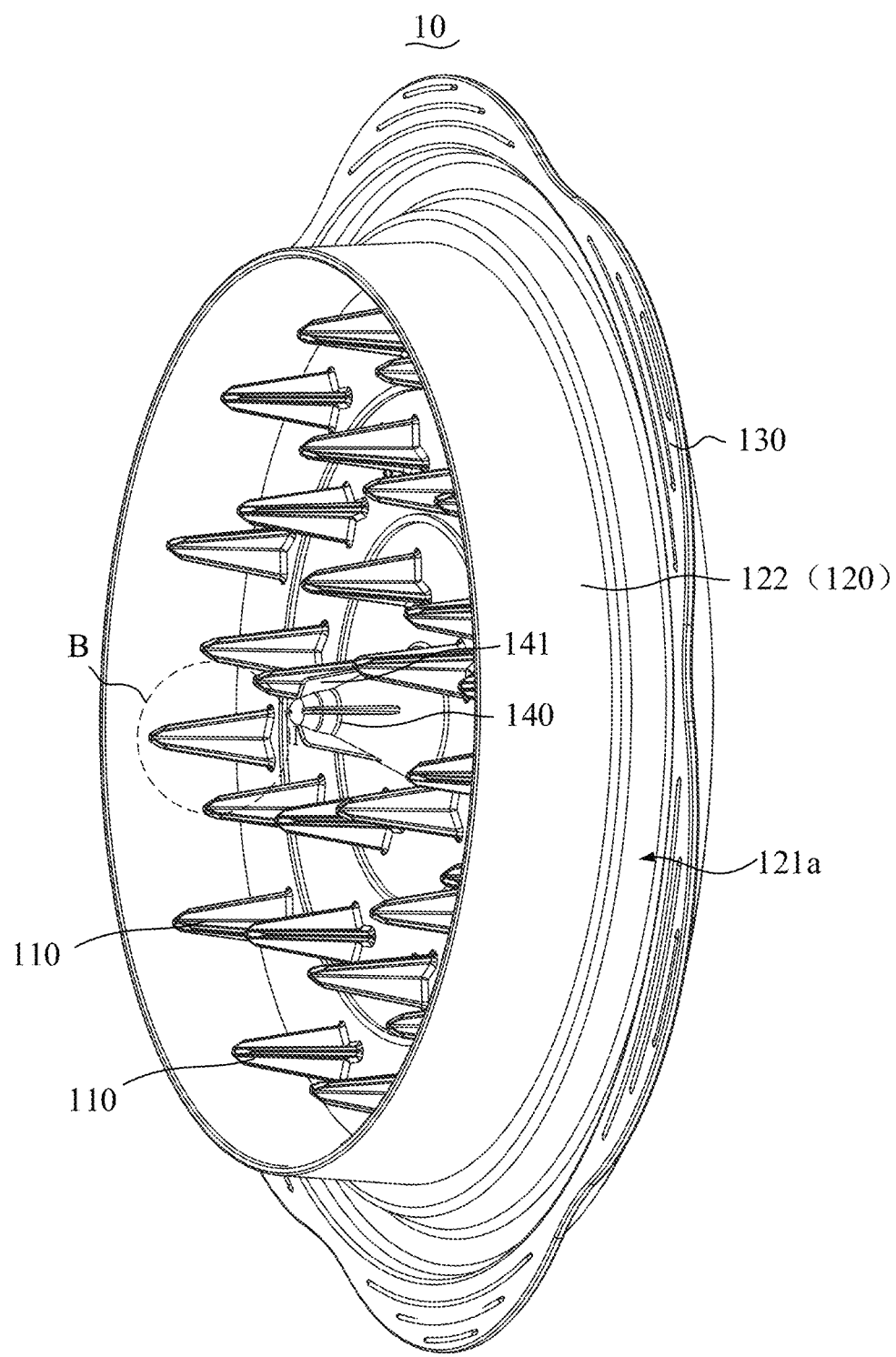
FIG. 9 is a structural schematic diagram of the bottom cover being in another representation angle according to one embodiment of the present disclosure.

Please refer to FIGS. 7 and 9, a cutter head 140 is disposed on a middle portion of the bottom cover 10, the inner container 50 further includes a blocking portion 520 protruding upward, the blocking portion 520 is adapted to an outer contour of the cutter head 140, and a middle hole 530 for a top portion of the cutter head 140 to pass through is defined on a top portion of the blocking portion 520. Generally, the users may put the meat on the middle portion of the bottom cover 10, and since the cutter head 140 is disposed on the middle portion of the bottom cover 10, the meat is ensured to directly fall into a working area of the cutter head 140 after entering the manual meat grinder 1, thereby improving the meat grinding efficiency.

Further, please refer to FIG. 9, second blades 141 are disposed on an outer side wall of the cutter head 140 at intervals. Since the second blades 141 disposed at intervals may act on the meat at the same time, the meat grinding efficiency is greatly improved. In this way, meat grinding time is shorten, and the working efficiency of the manual meat grinder is improved. As shown in the drawings, four second blades 141 are provided, and in other embodiments, there may be three, five, or six second blades 141, which is not limited herein.

Same or similar reference numerals in the drawings of the embodiments of the present disclosure correspond to the same or similar components. In the description of the present disclosure, it should be understood that orientations or working position relationships indicated by terms "upper", "lower", "left", "right", etc. are only for ease of description of the present disclosure and simplified description, rather than indicating or implying that the referred device or element must have a specific orientation, and is constructed and operated in a specific orientation, so the terms describing the working position relationships in the accompanying drawings are only used for exemplary description and cannot be understood as a limitation to the present disclosure, and for those who skilled in the art, specific meanings of above terms may be understood according to specific situations.

The above are only preferred embodiments of the present disclosure and are not intended to limit the present disclosure, and any modification, equivalent replacement and improvement made within a spirit and a principle of the present disclosure shall fall within a protection scope of the present disclosure.

What is claimed is:

1. A manual meat grinder, comprising:
    a bottom cover; and
    an upper cover;
    wherein the bottom cover comprises lower grinding teeth disposed at intervals; the upper cover comprises upper grinding teeth disposed at intervals, the upper cover covers the lower cover and is rotatably connected to the lower cover, so as to grind meat through cooperation of the upper grinding teeth and the lower grinding teeth; at least one of the bottom cover and the upper cover comprises blocking components disposed at intervals
    each of the upper grinding teeth and the lower grinding teeth comprises at least three grinding blades, and a root portion of each of the at least three grinding blades is connected to the upper cover or the bottom cover, each of the at least three grinding blades comprises a fixed end and a blade end respectively at two opposite ends thereof, and a distance between each fixed end and the blade end of a corresponding grinding blade is increased in a direction from a top portion of the corresponding grinding blade to the root portion of the corresponding grinding blade;
    the at least three grinding blades respectively comprise at least three fixed ends, and the at least three fixed ends are fixedly connected with each other, and the at least three grinding blades form included angles with each other;
    each of the at least three grinding blades of the upper grinding teeth and the lower grinding teeth comprises a first cutting surface disposed on the top portion thereof, and each first cutting surface is inclined from the top portion of the corresponding grinding blade to a bottom portion of the corresponding grinding blade in a direction from the fixed end of the corresponding grinding blade to the blade end of the corresponding grinding blade; and
    each blade end comprises a second cutting surface and a third cutting surface, and a distance between each second cutting surface and the third cutting surface of the blade end of the corresponding grinding blade is increased in a direction toward the fixed end of the corresponding grinding blade.

2. The manual meat grinder according to claim 1, wherein the upper cover comprises the blocking components, and the blocking components are circumferentially disposed.

3. The manual meat grinder according to claim 1, wherein the lower grinding teeth are divided into at least two rows, and the at least two rows of the lower grinding teeth have the same lower grinding teeth center point;
    the upper grinding teeth are divided into at least two rows, and the at least two rows of the upper grinding teeth have the same upper grinding teeth center point; and
    the at least two rows of the upper grinding teeth and the at least two rows of the lower grinding teeth are sequentially staggered.

4. The manual meat grinder according to claim 2, wherein distances respectively between one row of the upper grinding teeth and two rows of the lower grinding teeth adjacent to the one row of the upper grinding teeth are the same, and distances respectively between one row of the lower grinding teeth and two rows of the upper grinding teeth adjacent to the one row of the lower grinding teeth are the same.

5. The manual meat grinder according to claim 1, wherein the included angles between the at least three grinding blades of the upper grinding teeth and the lower grinding teeth are the same.

6. The manual meat grinder according to claim 1, wherein a width of each first cutting surface is decreased in a direction toward the blade end of the corresponding grinding blade.

7. The manual meat grinder according to claim 6, wherein each first cutting surface comprises a first segment and a second segment connected with the first segment; and
a width of each second segment is decreased in a direction away from the fixed end of the corresponding grinding blade.

8. The manual meat grinder according to claim 1, wherein connections between each first cutting surface, each second cutting surface, and each third cutting surface are rounded.

9. The manual meat grinder according to claim 1, wherein a thickness of each of the at least three grinding blades is decreased in a direction from the fixed end of the corresponding grinding blade to the blade end of the corresponding grinding blade.

10. The manual meat grinder according to claim 1, wherein the manual meat grinder further comprises an inner container, the inner container is detachably disposed in the bottom cover, a cutter head is disposed on a middle portion of the bottom cover, the inner container further comprises a blocking portion protruding upward, and a middle hole for a top portion of the cutter head to pass through is defined on a top portion of the blocking portion.

11. The manual meat grinder according to claim 10, wherein cutting blades are disposed on an outer side wall of the cutter head at intervals.

12. The manual meat grinder according to claim 1, wherein the manual meat grinder further comprises at least one handle, the at least one handle is disposed on the upper cover and is rotatably connected to the upper cover.

13. The manual meat grinder according to claim 12, wherein the upper cover comprises a cover body and at least one mounting tube, the at least one mounting tube is connected to a side wall of the cover body; the at least one handle is inserted into the at least one mounting tube and rotates with respect to the at least one mounting tube.

14. The manual meat grinder according to claim 13, wherein the at least one handle comprises a handle portion and a rotating portion, the rotating portion is connected to a bottom surface of the handle portion; the rotating portion comprises two clamping portions disposed at intervals, and a deformation space is formed between the two clamping portions.

15. The manual meat grinder according to claim 1, wherein at least one anti-skid component is disposed at a bottom portion of the bottom cover.

16. The manual meat grinder according to claim 1, wherein the bottom cover comprises a main body and extending portions, the extending portions are connected to an outer peripheral surface of the main body and are disposed at intervals, anti-skid protrusions are respectively disposed on the extending portions.

17. A manual meat grinder, comprising:
a bottom cover; and
an upper cover;
wherein the bottom cover comprises lower grinding teeth disposed at intervals; the upper cover comprises upper grinding teeth disposed at intervals, the upper cover covers the lower cover and is rotatably connected to the lower cover, so as to grind meat through cooperation of the upper grinding teeth and the lower grinding teeth; at least one of the bottom cover and the upper cover comprises blocking components disposed at intervals
each of the upper grinding teeth and the lower grinding teeth comprises at least three grinding blades, and a root portion of each of the at least three grinding blades is connected to the upper cover or the bottom cover, each of the at least three grinding blades comprises a fixed end and a blade end respectively at two opposite ends thereof, and a distance between each fixed end and the blade end of a corresponding grinding blade is increased in a direction from a top portion of the corresponding grinding blade to the root portion of the corresponding grinding blade;
the at least three grinding blades respectively comprise at least three fixed ends, and the at least three fixed ends are fixedly connected with each other, and the at least three grinding blades form included angles with each other; and
the manual meat grinder further comprises an inner container, the inner container is detachably disposed in the bottom cover, a cutter head is disposed on a middle portion of the bottom cover, the inner container further comprises a blocking portion protruding upward, and a middle hole for a top portion of the cutter head to pass through is defined on a top portion of the blocking portion.

\* \* \* \* \*